United States Patent [19]

Tadokoro et al.

[11] Patent Number: 5,376,474
[45] Date of Patent: Dec. 27, 1994

[54] HYDROGEN-ABSORBING ALLOY FOR A NEGATIVE ELECTRODE AND MANUFACTURING METHOD THEREFOR

[75] Inventors: Motoo Tadokoro, Ashiya; Mamoru Kimoto; Koji Nishio, both of Hirakata; Toshihiko Saitoh, Tuzukigun, all of Japan

[73] Assignee: Sanyo Electric Co., Ltd., Osaka, Japan

[21] Appl. No.: 14,382

[22] Filed: Feb. 5, 1993

[51] Int. Cl.$^5$ ............................................. H01M 4/04
[52] U.S. Cl. ...................... 429/59; 429/101; 429/218; 420/900
[58] Field of Search .................... 429/101, 59, 218; 420/900

[56] References Cited

U.S. PATENT DOCUMENTS

| 3,824,131 | 7/1974 | Beccu . | |
|---|---|---|---|
| 4,487,817 | 12/1984 | Willems et al. | 429/27 |
| 4,623,597 | 11/1986 | Sapru et al. | 429/101 |
| 4,925,748 | 5/1990 | Ikoma et al. | 429/101 |
| 5,071,720 | 12/1991 | Notten | 429/101 |
| 5,135,589 | 8/1992 | Fetcenko et al. | |

FOREIGN PATENT DOCUMENTS

| 0417802 | 4/1992 | European Pat. Off. . |
|---|---|---|
| 2228434 | 3/1991 | Japan . |
| 3219036 | 3/1991 | Japan . |
| 393158A | 4/1991 | Japan . |
| 3093159 | 6/1991 | Japan . |
| 3280357 | 12/1991 | Japan . |
| 4126361 | 4/1992 | Japan . |

OTHER PUBLICATIONS

"Double–Phase Hydride Forming Compounds: A New Class of Highly Electrocatalytic Materials", Notten and Hokkeling, *J. Electrochem. Soc.*, vol. 138, No. 7, Jul. 1991, pp. 1877–1887.

Primary Examiner—Stephen Kalafut
Assistant Examiner—M. Nuzzolillo
Attorney, Agent, or Firm—Spensley, Horn, Jubas & Lubitz

[57] ABSTRACT

The disclosure relates to a hydrogen-absorbing alloy for a negative electrode comprising: a main texture of Mm-Ni system having a crystal structure of CaCu$_5$ type; and a plurality of compound phases having a crystal structure other than the crystal structure of CaCu$_5$ type, where each of the compound phases are segregated in the main texture, and wherein a volume of each of the compound phases is less than about 10 $\mu m^3$. A distance between two adjacent compound phases should be less than about 100 $\mu m$. In the hydrogen-absorbing alloy the compound phases should include an element selected from a group of boron (B), carbon (C), tantalum (Ta), niobium (Nb), titanium (Ti), zirconium (Zr), molybdenum (Mo), tungsten (W) and bismuth (Bi).

6 Claims, 7 Drawing Sheets

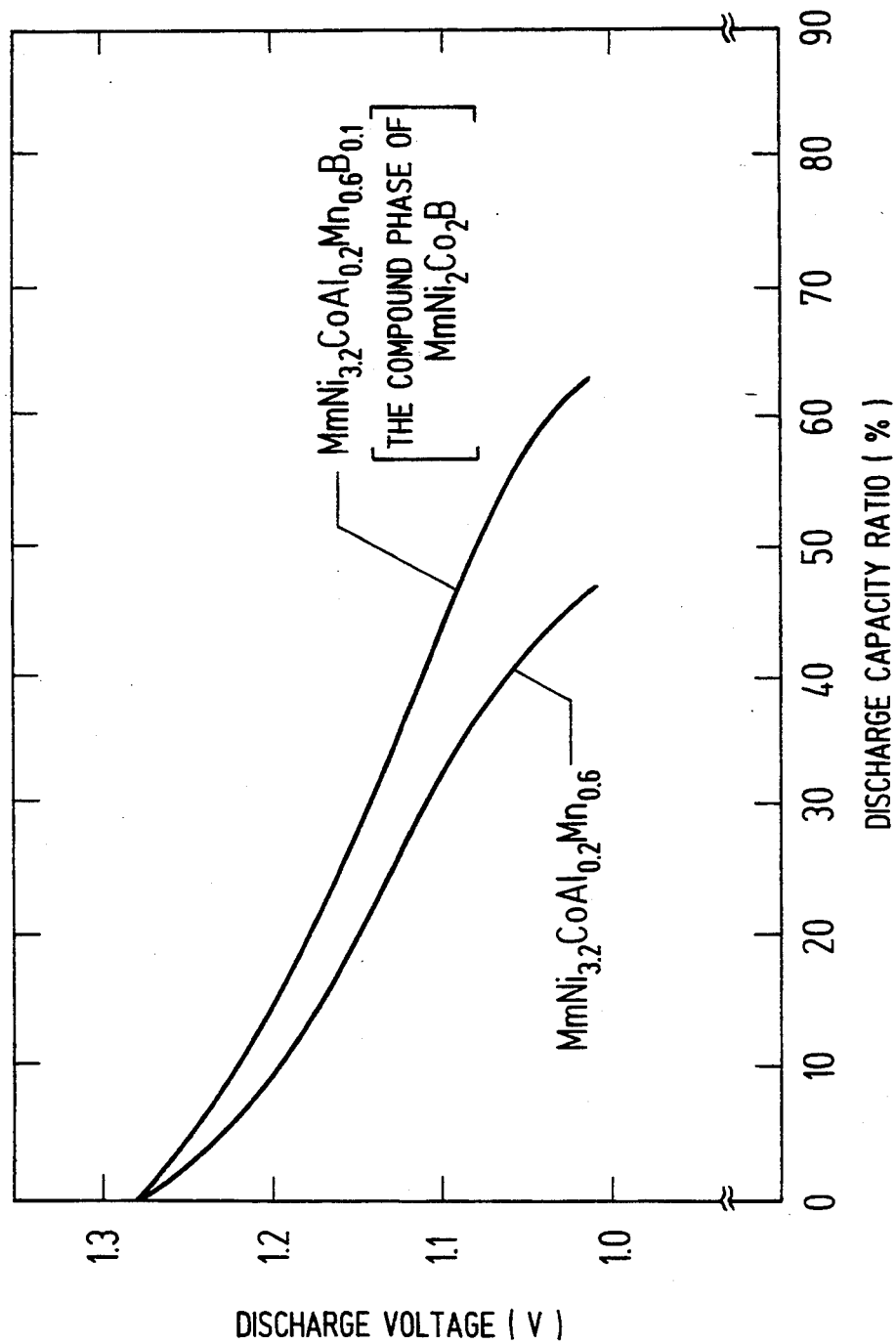

HYDROGEN-ABSORBING ALLOY FOR A NEGATIVE ELECTRODE AND MANUFACTURING METHOD THEREFOR

BACKGROUND OF THE INVENTION

1. Field of the Invention

This invention relates to a hydrogen-absorbing alloy used for a negative electrode in an alkaline storage battery.

2. Description of the Prior Art

Alkaline storage batteries, such as Ni-Cd batteries, or lead acid batteries, are known. Currently, lighter and larger capacity batteries with high energy density are needed. Therefore, metal hydride storage batteries, which utilize a hydrogen-absorbing alloy to reversibly absorb and desorb hydrogen as a negative electrode, are attractive.

The hydrogen-absorbing alloy for the negative electrode should be able to absorb and desorb reversibly at room temperature. An alloy satisfying this requirement is disclosed in the laid-open Japanese patent publication No. 60-89066, wherein a hydrogen-absorbing alloy of an Mm-Ni type is described. The "Mm" a "Misch Metal" is a mixture of rare earth elements, such as lanthanum (La), cerium (Ce), neodymium (Nd) and praseodymium (Pr). These alloys have been used in practice.

Electrochemical characteristics of the hydrogen-absorbing alloy electrode and the charge characteristics of an alkaline storage battery, that utilizes the hydrogen-absorbing alloy as a negative electrode, depend on various characteristics of the alloy used. Therefore, it is important to research and develop proper hydrogen-absorbing alloys for the electrode.

For example, in a $LaNi_5$ alloy, an $MmNi_5$ alloy, partial replacements of lanthanum (La), "Mm" or nickel (Ni) by other elements improves the discharge capacity, temperature dependency and charge-discharge cycle life characteristics. Accordingly, such replacements are often researched and tested.

When nickel (Ni) is partially replaced by cobalt (Co), copper (Cu) or another appropriate replacement, a change of volume in the alloy is controlled during charge-discharge cycles. As a result of this control, the alloy is prevented from flaking off of the electrode, and the charge-discharge cycle life of the battery is improved. Similarly, a partial replacement by manganese (Mn), aluminum (Al) or the like decreases the equilibrium-pressure of the hydrogen-absorbing alloy. Consequently, the amount of absorbed hydrogen is increased, as is the discharge capacity of the battery.

Another method of decreasing the equilibrium-pressure in the hydrogen-absorbing alloy, with a composition $MmB_x$, involves the reduction of the stoichiometric ratio "X" by an amount that element "B" is reduced. For example, the laid-open Japanese patent publication, No. 60-89066, describes a hydrogen-absorbing alloy, $AB_mC_n$, with a value of "m+n" in the range 4.8 to 5.4. Further, the laid-open Japanese patent publication No. 2-277737 describes a hydrogen-absorbing alloy represented by formula $ANi_aCo_bMn_c$, wherein the value of "a+b+c" ranges from 3.85 to 4.78. These methods increase the amount of the absorbed hydrogen in the hydrogen-absorbing alloy.

In manufacturing the hydrogen-absorbing alloy, each component of the alloy is measured and mixed in a fixed ratio, melted in an arc furnace with an inert argon atmosphere, and cooled in order to obtain hydrogen-absorbing alloy bulk. The alloys are then held in a vacuum furnace and heat treated at a high temperature (approximately 1000° C.) for a fixed period of time. This "annealing" heat treatment causes homogenization of the hydrogen-absorbing alloys. For instance, the laid-open Japanese patent publication No. 62-31947 describes an annealing treatment of the hydrogen-absorbing alloys within the temperature range of 950° C. to 1250° C.

To complete the electrode, the hydrogen-absorbing alloys are mechanically pulverized into granules having an average granule size of approximately 50 μm or less. The granules are then kneaded into a paste with powdered polytetrafluorethylene (PTFE), which acts as a binder and a conductive agent. The paste is coated onto a conductive substrate, such as a current collector, comprising a punched metal plate.

Despite the use of various types of hydrogen-absorbing alloys or manufacturing methods used to prepare the alloys, it is difficult to improve the initial discharge characteristics of batteries employing hydrogen-absorbing electrodes. The laid-open Japanese patents, Nos.3-219036 and 3-280357, describe the use of a hydrogen-absorbing alloy as a negative electrode in an alkaline storage battery in which the alloy's main phase does not include boron (B), while a sub-phase includes boron (B). This method is advantageous in that the addition of boron (B) to the alloy, generates cracks at the first charge-discharge cycle of the battery. The area formed by the cracks easily contacted with the alkaline electrolyte in the battery. As a result of contacting the electrolyte, the charge-discharge characteristics of the electrode improves relative to the first charge-discharge cycle.

The discharge characteristics of alkaline batteries, utilizing a hydrogen-absorbing alloy of formula $MmNi_{3.2}CoAl_{0.2}Mn_{0.6}B_{0.1}$ (referenced in the laid-open Japanese patent No. 3-280357) and a hydrogen-absorbing alloy of formula $MmNi_{3.2}CoAl_{0.2}Mn_{0.6}$ (used as a comparative example) have been tested. FIG. 7, a graph of the discharge characteristics of the electrodes used as negative electrodes of the batteries, depicts the results of such testing. In FIG. 7, the abscissa represents the discharge capacity ratio at 2 C discharge of the batteries and the vertical line represents the battery voltage. In the alloy $MmNi_{3.2}CoAl_{0.2}Mn_{0.6}B_{0.1}$, a subphase, with chemical formula $MmNi_2CO_2B$, is formed and observed. These tests demonstrate that the addition of boron (B) to the hydrogen-absorbing alloy prevents the deterioration of the discharge capacity and discharge voltage characteristics of the battery, even if the discharge current increases. In other words, adding boron (B) to the alloy improves the high rate discharge characteristics. The characteristics improve because adding boron (B) to the hydrogen-absorbing alloy generates cracks that form surfaces which easily contact with electrolytes. The contact with the electrolytes results in the improvement of electrode reactions.

Nonetheless, this method is not without problems. At times, the degree of dispersion of the boron (B) is small in manufacturing the hydrogen-absorbing alloy and the boron (B) occasionally coheres in the hydrogen-absorbing alloy. Consequently, the results obtained by adding the boron (B) prove insufficient. This inventor has encountered such inferior results.

SUMMARY OF THE INVENTION

The primary objective of the present invention is to improve the effects of additives, such as boron (B), in a hydrogen-absorbing alloy for a negative electrode.

Another objective of the present invention is to provide a hydrogen-absorbing alloy for a negative electrode with increased discharge capacity from the initial charge-discharge cycle.

A further objective of the present invention is to provide a hydrogen-absorbing alloy for a negative electrode with improved high rate discharge characteristics.

The above objectives are fulfilled by a hydrogen-absorbing alloy for a negative electrode comprising a main texture of Mm-Ni system with a crystal structure of $CaCu_5$, and a plurality of compound phases with a crystal structure differing from the $CaCu_5$ type. Each of the compound phases are segregated in the main texturet wherein the volume of each of these compound phases is less than about 10 $\mu m^3$.

The above objectives may also be fulfilled by a method of manufacturing a hydrogen-absorbing alloy for a negative electrode comprising the following steps: melting compositions to be used to form a hydrogen-absorbing alloy of Mm-Ni system having a crystal structure of $CaCu_5$ type; and cooling the melted compositions at a rate ranging from about $10^{3°}$ C./sec to about $10^{6°}$ C./sec in order to generate a plurality of compound phases with a crystal structure differing from the $CaCu_5$ type and segregated in the $CaCu_5$ type crystal structure.

Further, the above objectives may be fulfilled by a method of manufacturing a hydrogen-absorbing alloy for a negative electrode comprising the following steps: melting compositions to be used to form a hydrogen-absorbing alloy of an Mm-Ni system having a crystal structure of $CaCu_5$ type, wherein the compositions include cobalt (Co), nickel (Ni), and an element selected from a group of boron (B), carbon (C), tantalum (Ta), niobium (Nb), titanium (Ti), zirconium (Zr), molybdenum (Mo), tungsten (W) and bismuth (Bi); and cooling the melted compositions at a rate ranging from about $10^{3°}$ C./sec in order to about $10^{6°}$ C./sec to generate a plurality of compound phases having a crystal structure differing from a crystal structure of $CaCu_5$ type, segregated the crystal structure of $CaCu_5$ and having a volume of the compound phase less than about 10 $\mu m^3$.

In the hydrogen-absorbing alloy, the distance between two adjacent compound phases should be less than about 100 $\mu m$.

Additionally, each of the compound phases should include an element selected from a group of boron (B), carbon (C), tantalum (Ta), niobium (Nb), titanium (Ti), zirconium (Zr), molybdenum (Mo), tungsten (W) and bismuth (Bi).

Further, each of the compound phases may have a component selected from a group of $Mm(Ni-Co)_4B$, $Mm(Ni-Co)C_2$, $Nb_5Ni$, $Ti_2(Ni-Co)$, $Ti_3(Ni-Co)_4$, $Ti(Ni-Co)$, $V(Ni-Co)_2$, $\mu$-Mo-Ni-Co, W, $W(Ni-Co)_3$ and $Mm_2(Ni-X)_7$, wherein "X" is an element selected from a member of cobalt (Co), iron (Fe), copper (Cu), silver (Ag), manganese (Mn) and aluminum (Al).

BRIEF DESCRIPTION OF THE DRAWINGS

These and other objectives, advantages and features of the invention will become apparent from the following description taken in conjunction with the accompanying drawings that illustrate specific embodiments of the invention. In the drawings:

FIG. 7 is a graph showing the relationship between the discharge capacity and discharge voltage of the battery of a prior art.

DETAILED DESCRIPTION OF THE PREFERRED EMBODIMENT

In the hydrogen-absorbing alloy for a negative electrode comprising a main texture of Mm-Ni system having a crystal structure of $CaCu_5$ type for an alkaline storage battery, it is difficult to maintain a homogeneous hydrogen-absorbing alloy when compound phases, in the main texture, having a crystal structure differing from a $CaCu_5$ type crystal structure segregate. In this state, hydrogen is desorbed and absorbed in the hydrogen-absorbing alloy caused by discharging and charging of the electrode, subsequently generating stress in the hydrogen-absorbing alloy granule. As a result, cracks generate between the compound phases and the main texture having a $CaCu_5$ type crystal structure. The new surface, generated by the cracks, easily contacts to an alkaline electrolyte and thereby improves the electrode characteristics. Unfortunately, because the new surface is gathered in small portions and the compound phases is not dispersed, the advantage created by the additives is not fully realized.

In the present invention, the inventor succeeded in increasing the dispersion degree for a plurality of the compound phases, where the maximum volume of each of the compound phases is set less than 10 $\mu m^3$. Further, the distance between two adjacent compound phases, is suitably set at less than about 100 $\mu m$.

In this invention, each of the compound phases includes an element selected from a group of boron (B), carbon (C), tantalum (Ta), niobium (Nb), titanium (Ti), zirconium (Zr), molybdenum (Mo), tungsten (W) and bismuth (Bi).

Further, each of the compound phases has a component selected from a group of $Mm(Ni-Co)_4B$, $Mm(Ni-Co)C_2$, $Nb_5Ni$, $Ti_2(Ni-Co)$, $Ti_3(Ni-Co)_4$, $Ti(Ni-Co)$, $V(Ni-Co)_2$, $\mu$-Mo-Ni-Co, W, $W(Ni-Co)_3$ and $Mm_2(Ni-X)_7$, wherein "X" is an element selected from a member of cobalt (Co), iron (Fe), copper (Cu), silver (Ag), manganese (Mn) and aluminum (Al).

FIRST EMBODIMENT

Figure 1:
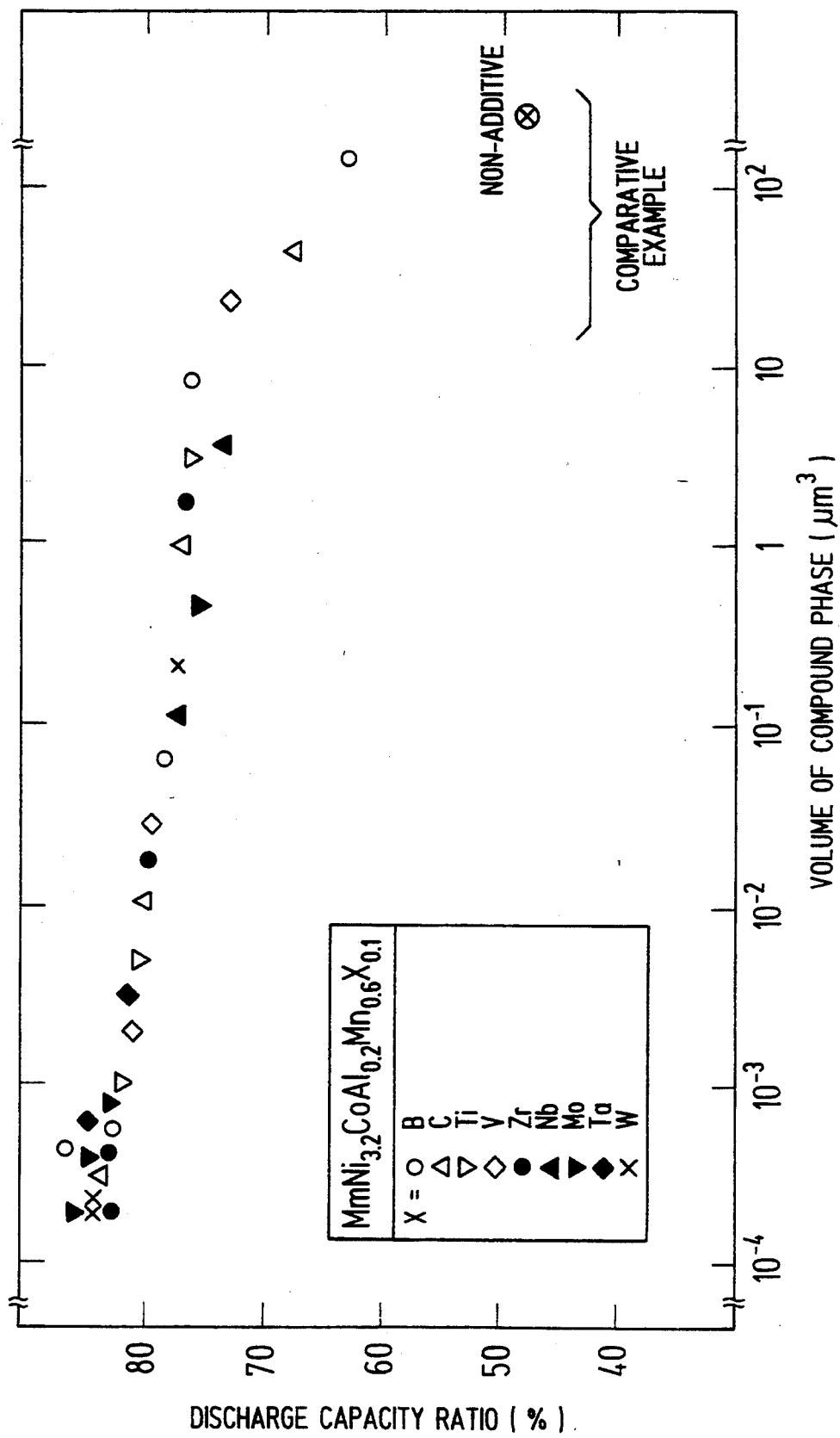
FIG. 1 is a graph depicting the relationship between the volume of the compound phase (maximum volume) and the discharge capacity ratio in the hydrogen-absorbing alloy, in accordance with the present invention.

In a first embodiment, after hydrogen-absorbing alloys are prepared, relationships between the compound phase in the alloys and high rate discharge characteristics are compared. The hydrogen-absorbing alloys used for the first embodiment primarily have a crystal structure of the $CaCu_5$ type and are represented by formulas of $MmNi_{3.2}CoAl_{0.2}Mn_{0.6}X_{0.1}$ and $MmNi_{3.2}CoAl_{0.2}Mn_{0.6}$. In the former hydrogen-absorbing alloy, $MmNi_{3.2}CoAl_{0.2}Mn_{0.6}X_{0.1}$, a plurality of the compound phases having a crystal structure differing from a $CaCu_5$ type crystal structure is observed. In this formula "X" represents the element selected from the group of boron (B), carbon (C), titanium (Ti), vanadium (V), zirconium (Zr), niobium (Nb), molybdenum (Mo), tantalum (Ta) and tungsten (W). FIG. 1 depicts the results of this test.

Figure 2:
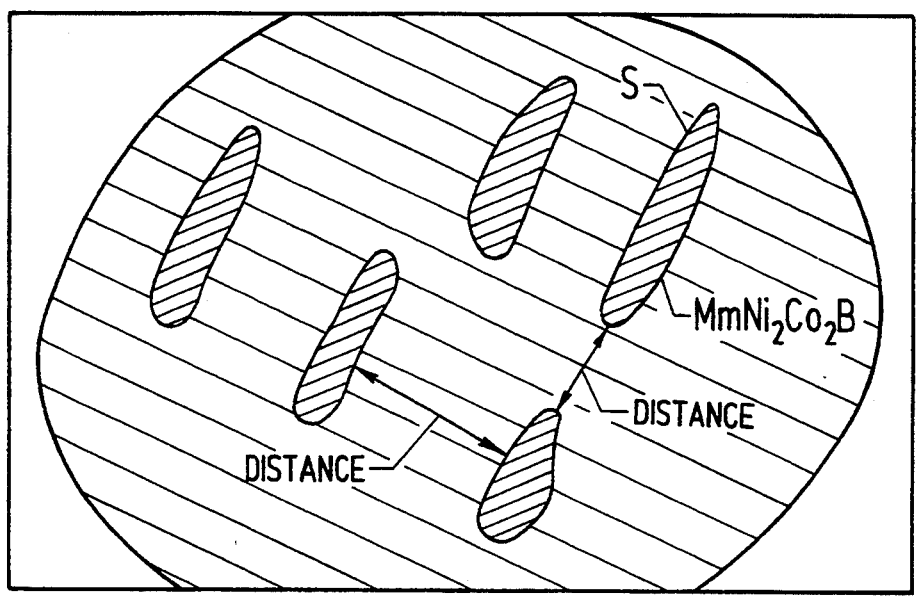
FIG. 2 is a cross-section of the hydrogen-absorbing alloy granule of the present invention.

In the present invention, the maximum volume of the compound phase is calculated as explained below. Observing a cross section of the hydrogen-absorbing alloy by EPMA (see FIG. 2), a maximum area, "S" of the compound phase in the cross section is measured. As a result, the volume of the compound phase is represented by the value of "$S^{3/2}$". FIG. 2 depicts a cross-section of the hydrogen-absorbing alloy granule represented by $MmNi_{3.2}CoAl_{0.2}Mn_{0.6}B_{0.1}$". In FIG. 2, the small ovals, with hatched potions, contained within the larger circular structure represent a plurality of the compound phase of a formula of "$MmNi_2CO_2B$" which is distinguished from the main texture having a crystal structure of $CaCu_5$ type. The larger circular structure with hatched portions, represents the main texture having the crystal structure of $CaCu_5$ type as a main phase in the hydrogen-absorbing alloy.

FIG. 1 shows the relationship between the volume of the compound phase (maximum volume) and the high rate discharge characteristics of the batteries. In FIG. 1, the abscissa represents the volume of the compound phase (maximum volume) and the vertical line represents the discharge capacity ratio at 4c discharge of the batteries compared to the discharge capacity at 0.2 C discharge.

To determine the relationship depicted in FIG. 1, the following experiment must be performed. First, the hydrogen-absorbing alloys must be classified. Next, the granules must be kneaded into a paste with a nickel powder, a conductive agent, and a powdered polytetrafluoroethylene (PTFE), a binder. In each paste, a weight ratio of "hydrogen-absorbing alloy":"conductive agent":"binder" is set at 5:4:1. These mixtures are measured to obtain 5.0 grams of the hydrogen-absorbing alloy, and then wrapped by nickel mesh, a conductive substrate, whereby the hydrogen-absorbing alloy electrodes are produced. Finally the hydrogen-absorbing alloy electrode as a negative electrode is combined with a sintered type nickel electrode to produce a battery with 1000mAh capacity, and tested. In the batteries, 30% KOH is used as an alkaline electrolyte.

As shown in FIG. 1, which depicts the results of these battery tests, when the volume exceeds approximately 10 $\mu m^3$ of the compound phase, a decrease in the discharge capacity ratio in the batteries is observed. Therefore, when the volume of the compound phase (maximum volume) is less than about 10 $\mu m^3$ in the hydrogen-absorbing alloy, excellent discharge characteristics of the batteries is obtained.

In the embodiment, samples of the hydrogen-absorbing alloys are prepared for the methods listed below. "Group A" represents the hydrogen-absorbing alloy produced by a high-frequency melting process after preparing an alloy ingot. "Group B" represents the hydrogen-absorbing alloy produced by an arc melting process after preparing an alloy ingot. "Group C" represents the hydrogen-absorbing alloy produced by an ultra quenching process after preparing an alloy ingot. "Group D" represents the hydrogen-absorbing alloy produced by a gas atomization process. Finally "Group E" represents the hydrogen-absorbing alloy produced by a strip casting process. Conditions on the manufacturing methods of the various groups are shown in Table 1 and Table 2.

TABLE 1

|  | Melting Process | Amount of produced alloy |
|---|---|---|
| Group A | high frequency melting | 5 kg |
| Group B | arc melting | 50 g |
| Group C | high frequency melting | 5 kg (on melting) 100 g (on cooling) |
| Group D | high frequency melting | 5 kg |
| Group E | high frequency melting | 5 kg |

TABLE 2

|  | Cooling Condition | Cooling Speed (°C./sec) |
|---|---|---|
| Group A | Casting thickness of 10 cm | 500–2000 |
| Group B | Cooling a button shape bulk on a copper plate | 500–2000 |
| Group C | Cooling on a water-cooled copper plate | 3000–8000 |
| Group D | atomizing method | $10^4$–$10^5$ |
| Group E | single roll process | $10^5$–$10^6$ |

The individual elements, such as boron (B), carbon (C), titanium (Ti), vanadium (V), zirconium (Zr), niobium (Nb), molybdenum (Mo), tantalum (Ta) and tungsten (W), are used as additives for the samples as indicated in Table 3.

TABLE 3

| An element as an additive | Manufacturing process | | | | |
|---|---|---|---|---|---|
|  | Group A | Group B | Group C | Group D | Group E |
| Boron (B) | X | X | X | X | X |
| Carbon (C) | X | X | X | X |  |
| Titanium (Ti) |  | X | X | X |  |
| Vanadium (V) |  | X | X | X |  |
| Zirconium (Zr) |  | X | X | X | X |
| Niobium (Nb) |  | X |  | X |  |
| Molybdenum (Mo) | X | X | X | X |  |
| Tantalum (Ta) |  |  |  | X | X |
| Tungsten (W) |  |  | X | X | X |
| Non-additive |  |  |  |  | X |

SECOND EMBODIMENT

In a second embodiment, the relationship between the volume of the compound phase (maximum volume) and the distance between two adjacent compound phases is researched. In the research, the "distance adjacent two of the compound phases" is decided by actually measuring the shortest distance between the compound phases under a microscope, where the cross sectional shape of the compound phase is approximated to an ellipse.

Figure 3:
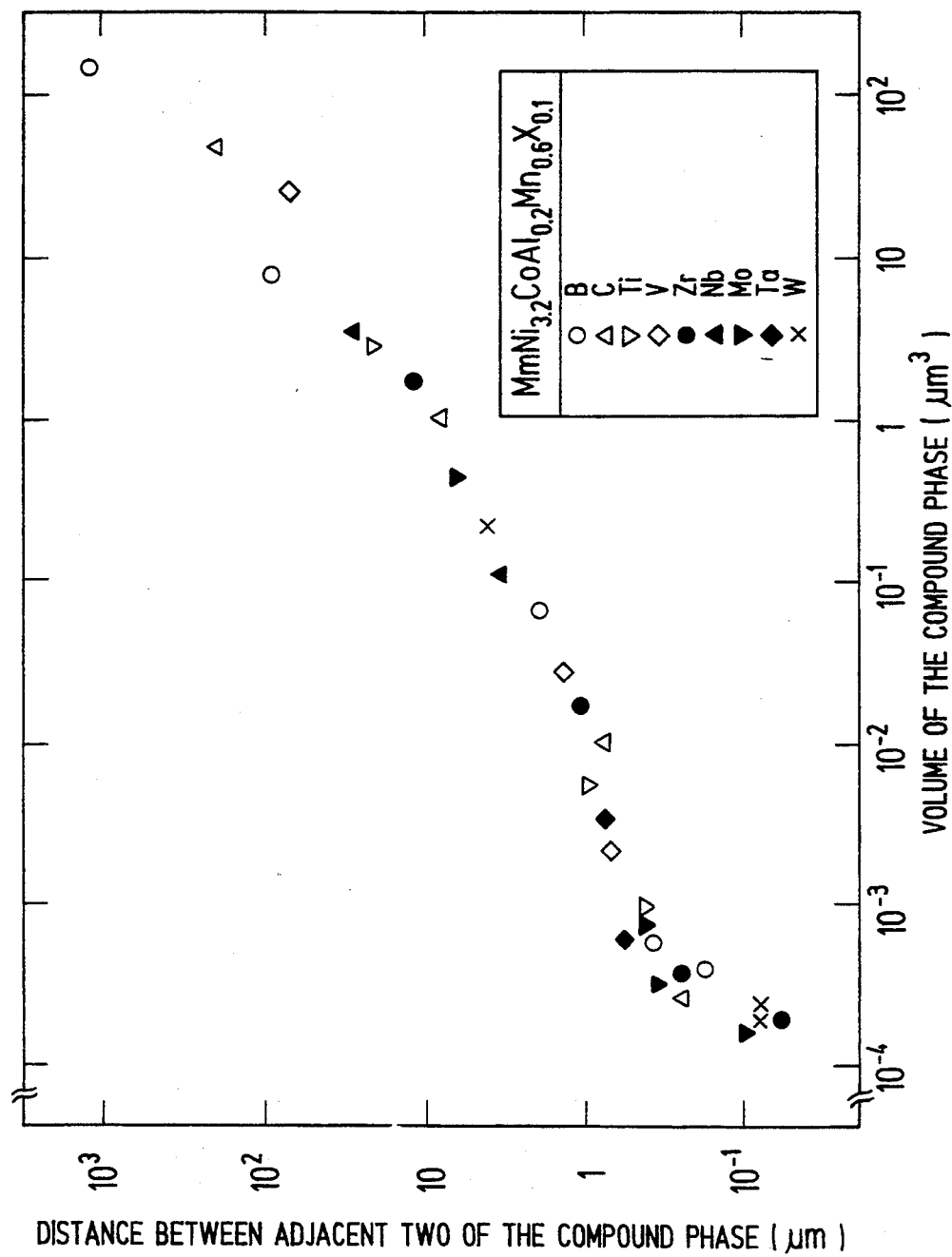
FIG. 3 is a graph depicting the relationship between the volume of the compound phase (maximum volume) and the distance between two adjacent compound phases of the present invention.

Typical results are shown in FIG. 3. According to the results, the region in which the volume of the compound phase is less than 10 $\mu m^3$ has the distance of less than the 100 $\mu m$. This territory has excellent high rate discharge characteristics. This result does not depend on the kinds of elements added to the hydrogen-absorbing alloy. The same results are observed in cases using boron (B), carbon (C), titanium (Ti), vanadium (V), zirconium (Zr), niobium (Nb), molybdenum (Mo), tantalum (Ta) and tungsten (W), respectively. Preparation of those alloys are carried out in the same manner as the first embodiment.

THIRD EMBODIMENT

In a third embodiment, the relationship between the cooling speed of melting compositions used to form the hydrogen-absorbing alloy and the volume of the compound phase (maximum volume) is examined. The cooling rate on manufacturing the hydrogen-absorbing alloy is changed according to samples prepared by above mentioned Group A, Group B, Group C, Group D and Group E. The ultra quenching process of Group C is completed by preparing a small amount, 10 g–50 g, of the alloy, and then cooling and rapidly hardening it on a copper plate with a sufficiently large heat content as compared to the alloy. These alloys are prepared in the same way as the above mentioned first embodiment. The hydrogen-absorbing alloy in the third embodiment is represented by the formula $MmNi_{3.2}CoAl_{0.2}Mn_{0.6}X_{0.1}$. In this formula an additive "X" is an element selected a group of boron (B), carbon (C), titanium (Ti), vanadium (V), zirconium (Zr), niobium (Nb), molybdenum (Mo), tantalum (Ta) and tungsten (W).

Figure 4:
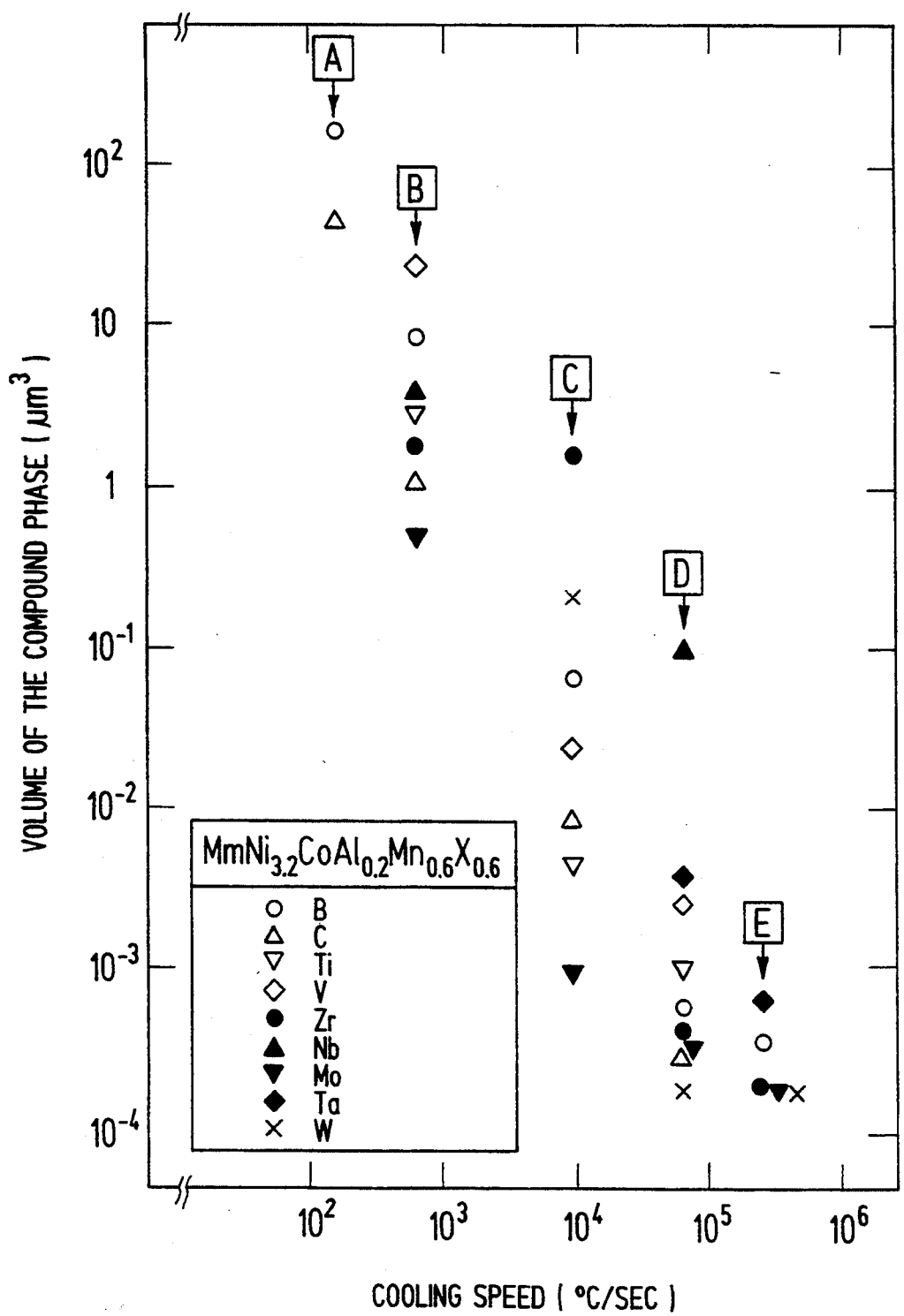
FIG. 4 is a graph showing the relationship between the cooling speed of manufacturing hydrogen-absorbing alloys and the volume of the compound phase (maximum volume), of the present invention.

Typical results are shown in FIG. 4. In FIG. 4, the abscissa represents the cooling speed (° C./sec) for manufacturing the hydrogen-absorbing alloy and the vertical line represents the volume of the compound phase (maximum volume). According to the results, the volume of the compound phase (maximum volume) largely depends upon the cooling speed. The result indicate that to obtain the volume for a compound phase of less than 10 $\mu m^3$, the cooling speed should range from $10^{3°}$ C./sec to $10^{6°}$ C./sec.

In this embodiment, the cooling speed is not measured directly, but rather is inferred from the hardening speed of the composition. Nonetheless, the cooling speed does not differ from the theoretical value.

FOURTH EMBODIMENT

In a fourth embodiment, the relationship between the concentration of the additive in the hydrogen-absorbing alloy of an element and the volume of the compound phase (maximum volume) is tested. The hydrogen-absorbing alloy used in the embodiment is represented by the formula $MmNi_{3.2}CoAl_{0.2}Mn_{0.6}X$, wherein "X" is selected from boron (B) or molybdenum (Mo). The cooling speed for producing the alloy is set at $10^{5°}$ C./sec.

Figure 5:
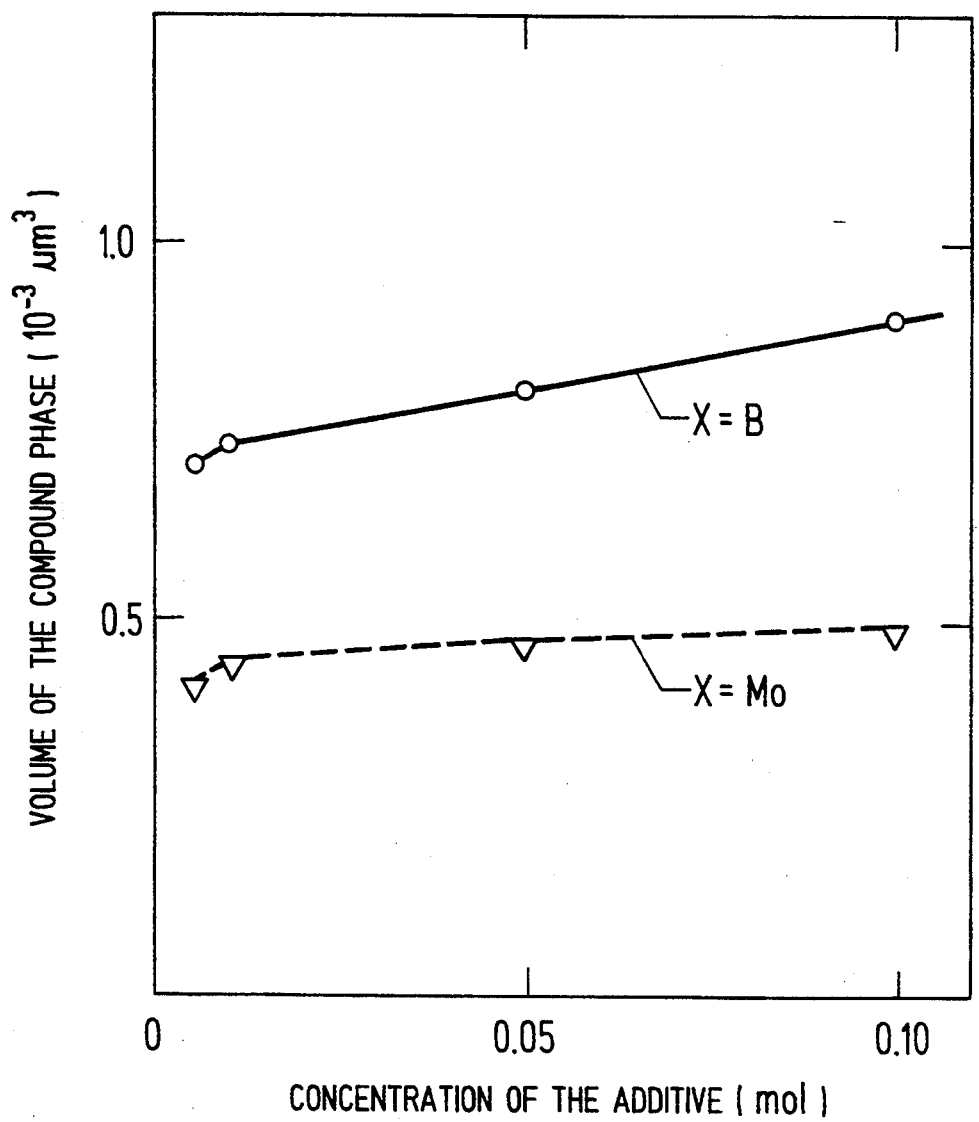
FIG. 5 is a graph showing the relationship between the concentration of the additives used to generate the plurality of compound phases in the hydrogen-absorbing alloy and the volume of the compound phase (maximum phase), of the present invention.

Typical results are shown in FIG. 5. FIG. 5 shows the relationship between the concentration of the additive "X" in the hydrogen-absorbing alloy and the volume of the compound phase (maximum volume). As shown in FIG. 5, there is no substantial change as to the volume of the compound phase ranging from 0.005 mol to 0.10 mol.

FIFTH EMBODIMENT

In a fifth embodiment, the relationship between the cooling speed of the alloy and the discharge capacity ratio at 4 C compared to 2 C discharge is researched. In this embodiment, "X" is boron (B) and the amount added to the hydrogen-absorbing alloy is changed. Further, the hydrogen-absorbing alloy is represented by the formula $MmNi_{3.2}CoAl_{0.2}Mn_{0.6}B_y$, wherein the "y" value is set at "0.1", "0.005" and "0", respectively.

Figure 6:
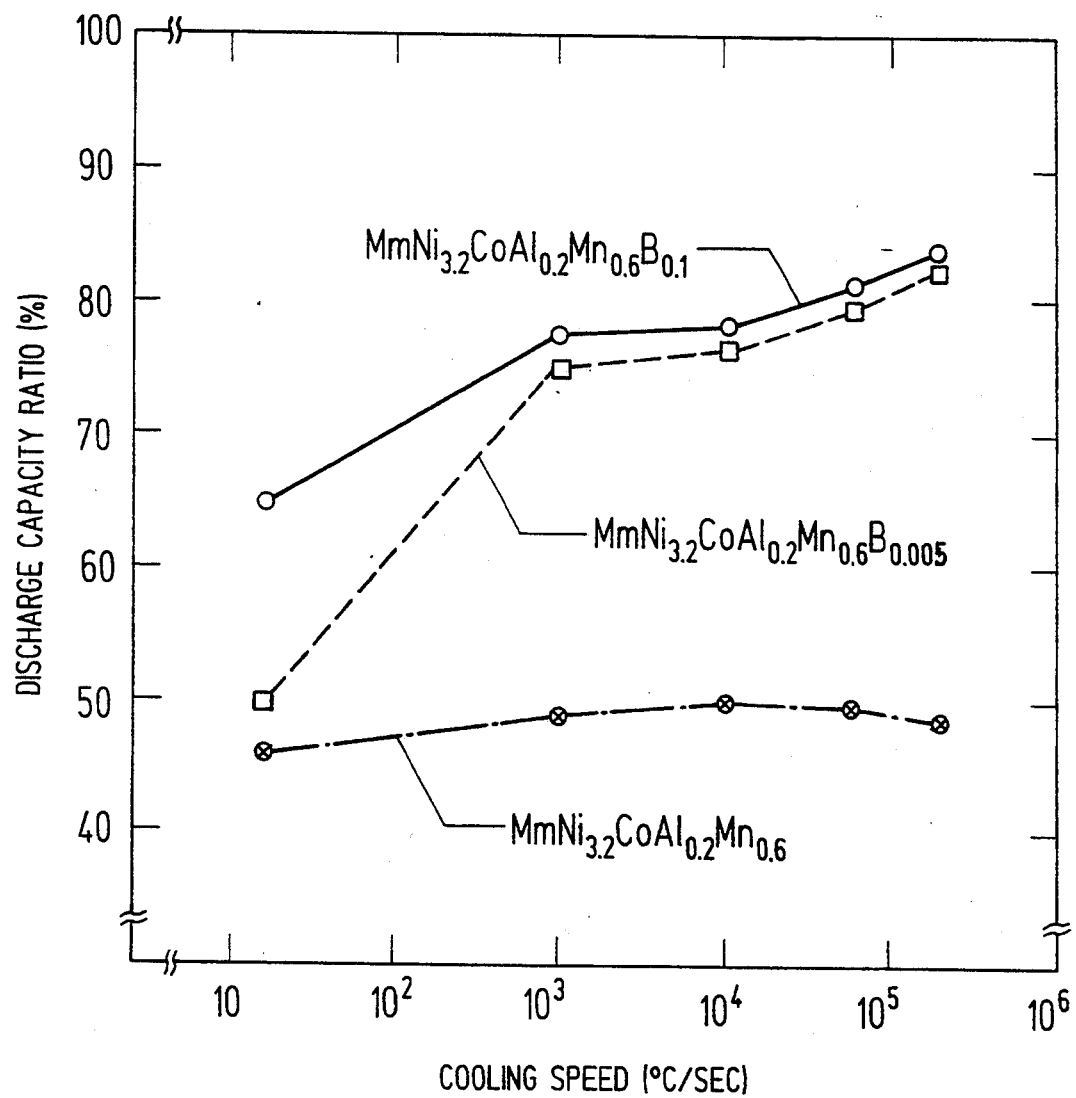
FIG. 6 is a graph showing the relationship between the cooling speed of manufacturing the hydrogen-absorbing alloy and the discharge capacity ratio of the present invention.

Typical results are shown in FIG. 6. FIG. 6 shows the relationship between the cooling speed for producing the alloy and the discharge capacity ratio.

According to FIG. 6, for cooling rates exceeding about $10^{3°}$ C./sec, an improvement of the discharge characteristics of the electrode is observed, even if the amount of the additive element "X" is set at 0.1 mol or 0.005 mol.

What is claimed is:
1. In a method of manufacturing a hydrogen-absorbing alloy for a negative electrode comprising the steps of:
   melting compositions to be used to form a hydrogen-absorbing alloy of an Mm-Ni system having a crystal structure of $CaCu_5$; and
   cooling the melted compositions to form a plurality of compound phases having a crystal structure other than the crystal structure of $CaCu_5$ and dispersed and segregated in the crystal structure, the improvement wherein said cooling is carried out at a cooling speed ranging from about $10^{3 °}$ C./sec to about $10^{6 °}$ C./sec to thereby allow each of said compound phases to have a volume of less than about 10 $\mu m^3$ and to disperse said plurality of compound phases with a distance between two adjacent compounds being less than about 100 $\mu m$.

2. A method of manufacturing hydrogen-absorbing alloy for a negative electrode according to claim 1, wherein each of the compound phases comprises an element selected from the group consisting of boron (B), carbon (C), tantalum (Ta), niobium (Nb), titanium (Ti), zirconium (Zr), molybdenum (Mo), tungsten (W) and bismuth (Bi).

3. A method of manufacturing hydrogen-absorbing alloy for a negative electrode according to claim 1, wherein each of the compound phases comprises a component selected from the group consisting of $Mm(Ni\text{-}Co)_4B$, $Mm(Ni\text{-}Co)C_2$, $Nb_5Ni$, $Ti_2(Ni\text{-}Co)$, $Ti_3(Ni\text{-}Co)_4$, $Ti(Ni\text{-}Co)$, $V(Ni\text{-}Co)_2$, $\mu\text{-}Mo\text{-}Ni\text{-}Co$, $W$, $W(Ni\text{-}Co)_3$ and $Mm_2(Ni\text{-}X)_7$, wherein "X" is an element selected from a group consisting of cobalt (Co), iron (Fe), copper (Cu), silver (Ag), manganese (Mn) and aluminum (Al).

4. A method of manufacturing a hydrogen-absorbing alloy for a negative electrode comprising the steps of:
   melting compositions to be used to form a hydrogen-absorbing alloy of Mm-Ni system having a crystal structure of $CaCu_5$, said compositions including cobalt (Co), nickel (Ni) and an element selected from the group consisting of boron (B), carbon (C), tantalum (Ta), niobium (Nb), titanium (Ti), zirconium (Zr), molybdenum (Mo), tungsten (W) and bismuth (Bi); and
   cooling said melted compositions at a cooling speed ranging from about $10^{3°}$ C./sec to about $10^{6°}$ C./sec in order to generate a plurality of compound phases having a crystal structure other than the crystal structure of $CaCu_5$ and segregated in the crystal structure of $CaCu_5$, where the volume of each of the compound phases is less than about 10 $\mu m^3$.

5. A method of manufacturing hydrogen-absorbing alloy for a negative electrode according to claim 4, wherein a distance between two adjacent compound phases is less than about 100 $\mu m$.

6. A method of manufacturing hydrogen-absorbing alloy for a negative electrode according to claim 4, wherein each of the compound phases comprises a component selected from the group consisting of $Mm(Ni\text{-}Co)_4B$, $Mm(Ni\text{-}Co)C_2$, $Nb_5Ni$, $Ti_2(Ni\text{-}Co)$, $Ti_3(Ni\text{-}Co)_4$, $Ti(Ni\text{-}Co)$, $V(Ni\text{-}Co)_2$, $\mu\text{-}Mo\text{-}Ni\text{-}Co$, $W$, $W(Ni\text{-}Co)_3$ and $Mm_2(Ni\text{-}X)_7$, wherein "X" is an element selected from a member of cobalt (Co), iron (Fe), copper (Cu), silver (Ag), manganese (Mn) and aluminum (Al).

* * * * *